United States Patent
Dirscherl et al.

(10) Patent No.: US 11,958,082 B2
(45) Date of Patent: Apr. 16, 2024

(54) METHOD, DEVICE AND COMPUTER PROGRAM FOR MANAGEMENT OF UNITS OF BULK MATERIAL

(71) Applicant: Innomotics GmbH, Nuremberg (DE)

(72) Inventors: Christian Dirscherl, Herzogenaurach (DE); Dan Niculae Fodor, Leinburg-Entenberg (DE); Torsten Hellmuth, Erlangen (DE); Holger Titz, Erlangen (DE)

(73) Assignee: INNOMOTICS GMBH, Nuremberg (DE)

( * ) Notice: Subject to any disclaimer, the term of this patent is extended or adjusted under 35 U.S.C. 154(b) by 752 days.

(21) Appl. No.: 17/257,185

(22) PCT Filed: Jul. 2, 2019

(86) PCT No.: PCT/EP2019/067708
§ 371 (c)(1),
(2) Date: Dec. 30, 2020

(87) PCT Pub. No.: WO2020/007846
PCT Pub. Date: Jan. 9, 2020

(65) Prior Publication Data
US 2021/0154706 A1    May 27, 2021

(30) Foreign Application Priority Data
Jul. 5, 2018    (EP) .................................... 18181988

(51) Int. Cl.
*B07C 5/342*    (2006.01)
*B07C 5/36*    (2006.01)
(Continued)

(52) U.S. Cl.
CPC ............ *B07C 5/3425* (2013.01); *B07C 5/362* (2013.01); *B65G 47/503* (2013.01); *B65G 47/5195* (2013.01); *G06N 20/00* (2019.01)

(58) Field of Classification Search
CPC ...... B07C 5/3425; B07C 5/362; G06N 20/00; B65G 47/503; B65G 47/5195
See application file for complete search history.

(56) References Cited

U.S. PATENT DOCUMENTS 6,369,376 B1    4/2002    Gerlach
7,696,480 B2 *  4/2010    Kostka ................. G01N 23/083
                                                    378/53

(Continued)

FOREIGN PATENT DOCUMENTS

DE    19737858        1/1999
EA       030756 B1    9/2018

(Continued)

OTHER PUBLICATIONS

Office Action (and a German translation) dated Aug. 11, 2021 issued in Russian Patent Application No. 2021102485.

(Continued)

*Primary Examiner* — Michael Collins
(74) *Attorney, Agent, or Firm* — Cozen O'Connor

(57) ABSTRACT

Method, device and computer program for managing units of bulk material of an ore mine with a throughput of a few tons of bulk material per minute, wherein a material property of each unit, in particular on a conveyor system, is determined, an entry for each unit containing the respective material property of the unit and the position of each unit are stored in a database, and additional includes at least one (i) determining a transport path downstream for the each unit based on the respective entry in the database, (ii) adapting the subsequent processing of each unit based on the material property of the unit, and creating a virtual model of the (Continued)

repository if a unit is supplied to a repository, where a position of each unit is stored, together with its respective material property, in the database.

16 Claims, 7 Drawing Sheets

(51) Int. Cl.
  *B65G 47/50* (2006.01)
  *B65G 47/51* (2006.01)
  *G06N 20/00* (2019.01)

(56) References Cited

U.S. PATENT DOCUMENTS

| | | | | |
|---|---|---|---|---|
| 7,707,003 | B2* | 4/2010 | O'Connor | B01F 25/82 73/861.73 |
| 8,878,090 | B2* | 11/2014 | Vladimirov | B07C 5/346 378/45 |
| 10,530,428 | B2* | 1/2020 | Quintrell | G07C 5/008 |
| 2005/0082207 | A1* | 4/2005 | Deppermann | G01N 21/3563 209/592 |
| 2020/0392831 | A1* | 12/2020 | Wu | E21B 41/00 |

FOREIGN PATENT DOCUMENTS

| WO | 2005031367 | 4/2005 |
|---|---|---|
| WO | WO 2013/149293 | 10/2013 |

OTHER PUBLICATIONS

PCT International Search Report and Written Opinion of International Searching Authority dated Feb. 12, 2019 corresponding to PCT International Application No. PCT/EP2019/067708 filed Feb. 7, 2019.

* cited by examiner

METHOD, DEVICE AND COMPUTER PROGRAM FOR MANAGEMENT OF UNITS OF BULK MATERIAL

CROSS-REFERENCE TO RELATED APPLICATIONS

This is a U.S. national stage of application No. PCT/EP2019/067708 filed 2 Jul. 2019. Priority is claimed on European Application No. 118181988.9 filed 5 Jul. 2018, the content of which is incorporated herein by reference in its entirety.

BACKGROUND OF THE INVENTION

1. Field of the Invention

The invention relates to a method, device and a computer program for management of bulk material of an ore mine with a throughput in the region of a few tons of bulk material per minute.

2. Description of the Related Art

As a rule, bulk material is transported for further processing from a mine with a conveyor facility, such as smelting, at least in some areas with a conveyor facility. Often, the bulk material is temporarily stored at a repository, in particular on a heap.

For improved processing there is preferably an analysis of the bulk material. As a rule, the analysis of the bulk material is undertaken based on samples with the aid of laboratory analyses. In such a laboratory analysis, the metal content of an ore or the ash content of brown coal can be determined, for example.

Modern applications allow an analysis of bulk material directly at the conveyor facility. Such an analysis is undertaken with the aid of x-rays, for example. U.S. Pat. No. 8,878,090 B2 describes such an analysis of bulk material on a conveyor belt. Previously, such an analysis has primarily served to slowly sort bulk material.

Conventional solutions are only suited to some extent however for use in an ore mine, in particular in a copper mine, due to the high throughput of the bulk material in the region of a few tons per minute.

The prior art further comprises methods for activation of a bucket wheel excavator for dumping (loading) or reclaiming (unloading) a heap. On the basis of the quantity of bulk material dumped, a profile of the surface of the heap can be determined with the aid of a mathematical model. The profile of the surface enables the bucket wheel excavator to be controlled during reclaiming of the bulk material from the heap so that it takes the bulk material from the edge of the heap. Such a system is described in DE 197 37 858 A1, for example.

Disadvantageously it has only been possible to some extent to date to perform a timely management of the bulk material on its way from its point of origin (the mine) to the point at which it is processed (e.g., blast furnace).

SUMMARY OF THE INVENTION

In view of the foregoing, it is an object of the invention to provide an option for management of the bulk material of an ore mine with a throughput in the region of a few tons of bulk material per minute. In particular, it is an object of the invention to make possible the management of bulk material in real time.

These and other objects and advantages are achieved in accordance with the invention by a method, a device and a computer program, where in accordance with the invention, the method for management of units of bulk material of an ore mine with a throughput in the region of a few tons of bulk material per minute, comprises determining a material property of the respective unit, in particular on a conveyor facility, storing an entry for the respective unit with the respective material property of the unit and the position of the respective unit in a database.

The method further has at least one of determining a transport path downstream for the respective unit of the bulk material on the basis of the respective entry in the database, adapting a subsequent processing of the respective unit on the basis of the material property of the unit, and if the respective unit is supplied to a repository, then creating a virtual model of the repository, wherein a position of the respective unit with the respective material property is stored in the database.

A unit of bulk material is preferably to be understood as a predeterminable quantity of bulk material. For example, a unit can be a ton of the bulk material, a fixed distance on a conveyor belt, a load of a mining truck or a volume, for example, a cubic meter.

A material property is particularly understood as the ore content of a rock, a metal content of an ore, an ash content of a coal or an energy value of a coal. In addition, the material property can be understood as the hardness or the grain size of the bulk material. The material property is preferably provided with the aid of an analysis facility.

A database is understood as a collection of entries, where a unit of the bulk material preferably corresponds to an entry in each case. The entering of the respective entry comprises the material property and the position of the respective unit. Optionally, the respective unit is numbered. Preferably, the position of the unit is regularly updated. A calibration of the analysis facility or a possible deviation in the material property can also supplement the respective entry of the database.

A repository is particularly understood as a silo, a heap or another type of repository for bulk material.

A conveyor facility is particularly understood as a conveyor belt, a belt conveyor, a railroad train or a mining truck.

A management of units of the bulk material is preferably understood as an evaluation and/or a tracking of the respective unit. An evaluation of the respective unit is understood as the allocation of the material property or of a variable derived from the material property to the respective unit. Through the allocation of the material property to the respective unit, the evaluation is preferably performed such that a high metal content or ore content of the respective unit results in a good evaluation. A tracking of the respective unit is preferably understood as a regular update of the database. In this way, the position of the respective unit at that moment can be ascertained with the aid of the database. Preferably, the tracking of the respective unit is done with the aid of a virtual model of the conveyor facility and/or with the aid of the database.

A transport path is preferably understood as the positions between which the bulk material is transported. A downstream transport path is understood as the path on which the respective unit, in particular with the aid of the conveyor facility, is transported to the analysis facility.

A virtual model of the repository is preferably understood as the position of the respective unit in the repository being stored in the database. Preferably, the virtual model of the repository occurs in at least one part of the database. Preferably, the virtual model of the repository also comprises the material property of the respective unit.

A processing of the bulk material is understood as a further crushing of the bulk material, a flotation, a combustion of a fuel such as coal, or a smelting of an ore. As an alternative, the loading of the respective unit onto a ship or a railroad freight car can correspond to a further processing.

The bulk material is preferably tracked from a first position to a second position on the conveyor facility.

The conveyor facility serves, for example, to transport the bulk material from its extraction location or from a repository (first position) to further processing of the bulk material or to another repository (second position).

The database serves to collect together the entries, where one entry is preferably assigned to the respective unit. The transport path and/or the position of the respective unit can be determined via the database.

The definition of the material property is preferably achieved with the aid of a first analysis facility, where the first analysis facility is positioned in the area of the conveyor facility. The material property is preferably defined in a non-contact manner. The material property is advantageously defined such that the respective unit can remain on the conveyor facility and the transport of the unit on the conveyor facility is not interrupted.

Through the management of the unit, where a unit will be stored or how the unit will be further processed can be planned and evaluated.

Preferably, the bulk material is extracted in a mine. The bulk material that is extracted in the mine is coarsely crushed with a mill. The coarsely crushed bulk material is preferably supplied with the aid of the conveyor facility to further processing or to a repository for temporary storage. Preferably, the first analysis facility is positioned after the mill. In particular, for temporary storage of the bulk material, the bulk material is stored in a repository. As an alternative, units that have been assessed as being of no further use are taken to a heap. Such units have an especially low ore content or especially many disruptive minerals, for example.

The respective unit in the database is preferably modeled such that the respective unit with the material property established and the position of the unit, in particular as a function of the time, corresponds to an entry in the database.

Preferably, the database is configured such that the position of the respective unit in the database, preferably as a function of the time, can be assigned to the respective entry.

The further processing of the bulk material or the loading of the bulk material, such as onto a ship, can be adapted via the database via the material property of the respective unit to be processed.

Preferably, the analysis of the bulk material is undertaken with the aid of x-rays, with visible UV and/or IR light. As an alternative, an analysis of the bulk material can be undertaken via a radiometric determination.

Preferably, the respective unit on the conveyor facility and/or in the repository is then accepted as an entry into the database as soon as the material property can be assigned. Preferably, the respective entry comprises the position as a function of the time.

The function of the time is preferably defined by the speed of the conveyor facility.

Preferably, the downstream transport path is defined by evaluating the respective unit.

The respective unit of the bulk material can be traced with the aid of the database. For this, for example, the respective unit is linked to the location of the respective unit on the conveyor facility (as a function of the time).

The database preferably comprises entries that correspond to the units that are positioned on the conveyor facility and/or in the repository. Preferably, the virtual modeling of the repository and also the tracking of the respective unit on the conveyor facility are undertaken with the aid of the same database. For entries that correspond to the units on the conveyor facility, there is preferably a representation of the position as a function of the time.

As an alternative or in addition, the virtual modeling of the conveyor facility is done such that the entries are assigned to areas of the conveyor belt and the units pass through the entries of the database as in a shift register.

Furthermore, the respective unit can also be linked to a position in the repository. The unit or the entry here can be assigned to a volume element in the repository. Preferably, the volume element is assigned to the respective unit variably, so that even with a change in the repository, for example, a recompaction of the repository or a removal from one side of the repository, the position of the respective unit of the bulk material can be tracked. A change in the repository can be determined with the aid of sensors and the position of the respective units can be corrected accordingly in the database.

When the unit of the bulk material is removed from the repository, the database is updated accordingly. The removed unit can be tracked on the conveyor facility.

An especially simple version is produced by the use of a common database, where the common database comprises the respective unit of the bulk material both with the position of the respective unit on the conveyor facility and/or the position in the repository. The respective entry of the database can comprise the material property of the respective unit of the bulk material.

Preferably, the transport path of the respective unit can be detected with the aid of the method. The transport path preferably comprises the conveyor facility from the analysis facility to the repository or to further processing. Optionally a part of the units is stored (intermediately) in a repository.

For an improved overview, the content of the database can be presented graphically to a user. In this way the conveyor facilities and/or the respective repository can be displayed and the respective unit shown in its position at the respective conveyor facilities or repositories. Preferably, the material property of the respective unit or its evaluation is displayed in accordance with a color code. The information can be displayed at a control center of a mine, a port installation or a heavy industry installation or a power station.

The knowledge of the material property of the respective unit enables subsequent processes, such as crushing processes, preparation processes or a firing to be adapted to the material property of the respective unit. This enables subsequent processes to be designed more efficiently.

The disclosed invention enables a seamless supervision of the bulk material, for example, starting from a mine through to further processing or transshipment in a port installation.

In an advantageous embodiment of the invention, the position of the respective unit in the database is determined with the aid of a speed of the conveyor unit.

Preferably the current position of the respective unit in each case is stored as an entry in the database.

In accordance with the presently contemplated embodiment, the database is regularly updated. To this end, a speed of transport of the conveyor facility can be provided for the database. The knowledge of the speed of the conveyor facility enables the position of the respective unit on the conveyor facility to be calculated as a function of time. The calculation of the current position advantageously enables accesses to the database to be reduced.

The speed of the conveyor facility can be determined with the aid of imaging sensors. The speed can also be determined by a nominal speed that is provided to a drive of the conveyor facility.

The speed of the conveyor facility can be defined by sensors and/or be predetermined by a higher-ranking conveyor facility.

In the case of mining trucks, GPS data can be used to ascertain the position of the respective unit.

Specifying the position of the respective unit enables a seamless management of the respective unit.

In a further advantageous embodiment of the invention, a separation apparatus is controlled with the aid of the respective entry in the database, where the separation apparatus separates units via the respective material property via a first conveyor facility, in particular for further processing, or via a further conveyor facility, in particular for storage on a heap.

The separation apparatus preferably ascertains the downstream transport path of the respective unit. The separation apparatus is preferably activated in real time.

The separation apparatus actively enables the management of units of the bulk material to be controlled.

In a further advantageous embodiment of the invention, the material property of the respective unit is ascertained via a first analysis facility, where the material property of the respective unit is ascertained on the conveyor facility.

The first analysis facility and/or a second analysis facility preferably ascertain the material property with the aid of electromagnetic radiation, in particular x-ray radiation.

Electromagnetic radiation is reflected and/or absorbed by the bulk material. Preferably, the reflected electromagnetic radiation is detected with a detector. As an alternative or in addition, the non-absorbed electromagnetic radiation can also be detected with a detector.

Electromagnetic radiation of different wavelength ranges can be applied. The analysis facility is preferably based on x-ray absorption spectroscopy. As an alternative or in addition, the material property can be determined with the aid of visible light (wavelengths from 400 to 800 nanometers), UV light (wavelengths from 100 to 400 nanometers) and/or in IR light (wavelengths from 800 nanometers to around 50 micrometers). Preferably, the analysis facility has a detector for the reflected and/or non-absorbed electromagnetic radiation.

Through the use of electromagnetic radiation, in particular x-ray radiation, the respective material property is ascertained rapidly and securely.

The analysis facility preferably serves to determine an absorption spectrum and/or a fluorescence spectrum. The desired material property can be deduced with the aid of the spectrum.

Preferably, one spectrum is assigned in each case to a unit of the bulk material. Such a spectrum is preferably provided as the result of a measurement in the form of a signal of a computing facility and/or of a control facility.

The material property of the respective unit is advantageously calculated with the aid of a computing facility, which is assigned to the analysis facility.

In a further advantageous embodiment of the invention, the material property of the respective unit of the bulk material is provided with the aid of a self-learning algorithm.

The absorption spectrum or the fluorescence spectrum are preferably evaluated with the aid of a self-learning algorithm. The material property is assigned via the spectrum of the respective unit of the bulk material.

Preferably, the respective analysis facility is "trained up" with the aid of units of bulk material for which the material property is known.

The use of a self-learning algorithm enables an especially rapid and efficient evaluation of the spectra to occur. In this way, the function of the analysis facility can be further improved.

The material property of the respective unit is preferably ascertained such that the unit is analyzed directly on the conveyor facility. When the conveyor facility is designed as a conveyor belt, the material property of the respective unit is ascertained such that the respective unit is analyzed with optical methods while the unit is being guided along the first analysis facility.

In the case of a mining truck as a conveyor facility, the analysis facility is positioned on the mining truck and ascertains the material property of the respective unit during the transport of the respective unit on the mining truck.

The analysis of the respective unit directly on the transport facility makes it possible to ascertain the material property in an especially rapid and simple way.

In a further advantageous embodiment of the invention, the material property is assigned to the respective unit while the respective unit is located on the conveyor facility.

The material property is preferably assigned to the respective unit as part of the virtual modeling of the conveyor facility. The material property is preferably assigned by assignment of the material property to the corresponding entry in the database. In particular, through the optical analysis of the respective unit, a rapid ascertainment of the material property of the respective unit is possible. The respective unit can be located on the conveyor facility for at least a few more seconds.

The assignment of the material property to the respective unit enables the decision about where the unit will be transported to or how the unit will be further processed to be made while the respective unit is located on the conveyor facility. In this way, the wastage of bulk material can be significantly reduced.

In a further advantageous embodiment of the invention, the material property is assigned and/or the respective unit is evaluated in real time.

An assignment of the material property to the respective unit in real time can be understood as the assignment occurring quickly enough for a model of the unit, together with the material property, to be stored in the database or in the virtual image.

An assignment of the material property in real time can be understood as the assignment of the material property to the respective unit occurring within a period of time that lies between switching times of a drive controller.

Accordingly, an assignment of the material property to the respective unit in real time can be understood as an assignment within five milliseconds, preferably within two milliseconds. The short duration of the assignment enables it to be insured that there can be a flow regulation of the drive, for example, of the conveyor facility, without delay.

In general, an assignment of the material property in real time can be understood as a very rapid assignment, so that subsequent processes are not delayed.

In a further advantageous embodiment of the invention, the content of the database and/or of the virtual model is shown to a user. The information is preferably displayed at a control console. The information is preferably displayed such that a user is shown a display of the course of the respective unit on the conveyor facility and/or at the repository.

The material property can be displayed with the aid of an assignment of a color for areas of the material property.

The display of the material property enables the user to grasp the significant processes of the bulk material at a glance.

In a further advantageous embodiment of the invention, a processing profile of the repository is determined via the virtual model of the repository, where a loading and/or unloading apparatus is activated with the aid of the processing profile.

With a heap, a processing profile can be formed as the surface profile of the heap. A processing profile advantageously comprises a surface profile and a part indicating the position of the repository at which units of bulk material are assigned to a predeterminable material property. The part can also specify the position of the respective unit in the repository. Such a surface profile advantageously specifies the height of the stored bulk material as a function of its position. With the aid of the surface profile, the loading and/or unloading apparatus can be activated, so that units of bulk material are taken from an intended position. Such a surface profile can be formed as a two-dimensional surface in a three-dimensional space.

In accordance with the processing profile, the loading and/or unloading apparatus can be activated so that a prespecified unit can be taken from a surface of the repository, in particular of the heap.

In accordance with the processing profile, it is preferably determined from where a loading and/or unloading apparatus can take units of the bulk material in order to unload bulk material with an intended material property.

Such a loading and/or unloading apparatus can be formed as a bucket wheel excavator.

In particular with a repository that is formed as a heap, weathering influences or a recompaction can lead to a change in the position of the respective unit. Such a change can be determined, for example, with the aid of sensors and the position of the respective unit corrected accordingly. The correction is preferably made with aid of a physical model, where the compressibility or the quantity of the air pockets of the bulk material form an input variable.

The sensor-based definition of properties of the heap enables units of an intended material property to be unloaded from the repository.

In an advantageous embodiment of the invention, the material property of the respective unit is defined with the aid of a self-learning algorithm.

Preferably, the respective unit of the bulk material is analyzed by a measurement routine. The analysis facility provides measurement data by which the evaluation of the measurement data, preferably the ascertainment of the material property, takes place.

The material property is ascertained via the measurement data with the aid of an evaluation algorithm. Preferably, the evaluation algorithm is based on a semi-empirical model with a self-learning component.

The self-learning algorithm is preferably constructed as a neural network. Artificial intelligence methods can also advantageously be used for evaluating the analysis results.

The use of evaluation algorithms capable of learning enables an ongoing improvement in the provision of the material property to be achieved.

In a further advantageous embodiment of the invention, the material property of at least a part of the units is redetermined at a second position.

Preferably, the redetermined material property of the respective unit is provided to the first analysis facility. The redetermined material property preferably serves to improve the evaluation algorithm, in particular to improve the self-learning algorithm.

Furthermore, units with a high evaluation, i.e., preferably with a high metal content, can be analyzed once again.

Defining the material property of the respective unit twice advantageously enables the respective analysis facility to be improved in its function.

In an advantageous embodiment of the invention, the virtual model of the repository is updated after the removal of a unit.

The virtual model of the repository is advantageously corrected after loading with at least one unit, where the unit is added in within the virtual model at the position at which the loading of the repository has taken place.

The virtual model is advantageously updated when a unit is removed, because the respective unit taken out is removed from the virtual model of the repository.

Preferably, the unit removed from the repository in each case is detected and tracked on a conveyor facility.

The virtual model of the repository is preferably updated at regular intervals.

The updating of the virtual model of the repository enables it to be tracked at any time where/how many units of a material property are located in/at the repository.

In a further advantageous embodiment of the invention, the unit removed from the repository is further tracked via a virtual model of the conveyor facility.

Preferably, the respective unit is tracked after an unloading of the repository onto the conveyor facility via the virtual modeling of the respective conveyor facility.

The tracking of the respective unit after removal from the repository, in particular with the aid of a further virtual model of the conveyor facility onto which the unit is transferred, enables a seamless tracking of the respective unit from the mine to loading onto a ship/a railroad car or up to its further processing.

In a further advantageous embodiment of the invention, at least a part of the steps of the method are performed with the aid of at least one processor of at least one computing unit.

The computing unit is preferably assigned to a control facility. The computing facility can also be formed as a decentralized server in a network and/or in a cloud.

With the aid of the computing unit the following can be performed (i) control or regulation of a speed of the conveyor facility (ii) management of the database, in particular for the virtual modeling of the respective conveyor facility or of the respective repository, (iii) provision of the material property based on measured values of the respective analysis facility and/or activation of the loading and/or unloading apparatus for the repository.

The respective unit is preferably tracked with aid of a virtual model of the conveyor facility. If there is a plurality of conveyor facilities, these can be logically linked together by a virtual model.

The computer program is preferably configured to perform the above-described disclosed embodiments of the invention, where the computer program can be executed on at least one computing unit with the aid of at least one processor, where a database is assigned to the computer program, and where the computer program creates and/or updates the entries of the database.

The computing unit is preferably formed as a cloud. The computer program preferably has interfaces for provision of the measurement results from the respective analysis facility. The computer program preferably comprises the database, where the database is configured in a similar way to a shift register for storage of the respective unit, provided the unit is positioned on the conveyor facility or in the repository.

After the shipment or during the processing of the respective unit, the image of the unit is preferably deleted from the database.

The apparatus for management of units of bulk material of an ore mine with a throughput in the region of a few tons of bulk material per minute, comprises a conveyor facility, at least a first analysis facility and also a control facility, where the control facility is configured to perform the method in accordance with the disclosed embodiments.

The apparatus optionally comprises a separation apparatus. The separation apparatus serves to separate units onto a number of conveyor facilities. The separation apparatus preferably serves to separate the respective units in order to supply the respective unit to its downstream transport path.

The apparatus can further comprise one or more repositories, where the respective repository is formed for temporary storage of the respective unit of the bulk material.

In a further advantageous embodiment of the invention, with the material property, which is provided by one of the analysis facilities or during the processing of the respective unit of the bulk material, the other analysis facility in each case or the processing of the bulk material is improved.

Preferably, at least a part of the units of the bulk material passes through the second analysis facility. Furthermore, via the further processing, the material property of the respective unit of the bulk material can be determined.

Ascertaining the material property of the unit of the bulk material once again preferably serves to correct the material property of the respective unit of the bulk material.

Preferably, with the aid of the second analysis facility the accuracy of the virtual model of the repository is established. The renewed determination of the material property of the unit, which has been unloaded or removed from the repository, enables the accuracy of the virtual model of the repository to be determined.

Furthermore, the result of the second analysis facility can serve to improve the self-learning algorithm of the first analysis facility. As an alternative or in addition, the result of the first analysis facility can also serve to improve the self-learning algorithm of the second analysis facility.

A comparison of the material properties of the respective unit of the bulk material enables the quality of the respective analysis or the function of the respective analysis facility to be ascertained. Furthermore, it can be established how well or how accurately the tracking of the units of the bulk material and/or the separation facility is functioning.

In a further advantageous embodiment of the invention, the units of the bulk material of the repository are transferred onto the conveyor facility again in accordance with the virtual model of the repository, in particular via a surface profile or a processing profile of the repository.

The respective unit, which passes through the first analysis facility, can be temporarily stored in the repository. The respective unit of the bulk material can be positioned with the aid of the virtual model of the repository. The virtual model of the repository enables an unloading apparatus, in particular a bucket wheel excavator, to be activated. The unloading is achieved with the aid of the unloading apparatus. The unloading apparatus is preferably activated based on the processing profile of the respective repository.

With the aid of the removal apparatus, the respective position of the bulk material can be moved to and the desired unit of the bulk material removed from the repository.

The respective unit is transferred again from the repository onto the appropriate conveyor facility. With the aid of the conveyor facility, the respective unit of the bulk material can be supplied to a loading station or for further processing.

For a heap, the surface profile of the repository is a profile of the surface of the heap. In the case of a silo, the surface profile can correspond to the fill level, in particular as a function of the position in the silo. In addition, the processing profile comprises the position of the respective unit and optionally the material property of the respective unit.

With the surface profile or the processing profile, the removal apparatus can be activated so that there is no collision of a shovel or of any other tool with the surface of the repository. An activation of the removal apparatus and of the storage apparatus for the bulk material can be controlled in accordance with the surface profile. With the processing profile, the unloading apparatus can be activated such that units of bulk material of a predeterminable material property are unloaded from the repository.

In a further advantageous embodiment of the invention, as a function of the material property of the respective unit, an apparatus for loading and/or for unloading of bulk material of the repository can be activated, so that (i) the bulk material is stored as a function of the virtual model of the conveyor facility, the units of the bulk material are stored at the repository, (ii) and/or in accordance with the virtual model of the repository a processing profile of the repository is created and the apparatus for storage and/or removal of the bulk material is controlled in accordance with the processing profile, (iii) and/or, via the virtual model of the repository, during the unloading of the respective unit of the bulk material, in particular units with a defined material property are removed.

Preferably, the unloading apparatus is controlled such that units are removed from the repository that have a predeterminable averaged material property. In this way, for example, an ore content of 5% constant over time can be transferred from a repository to a conveyor facility.

Preferably, the bulk material is removed from the repository such that only units with a predetermined material property, such as 10% ore content, are transferred onto the conveyor facility.

Preferably, the units of the bulk material are stored in the repository in accordance with predefined scheme. For example, units with a high ore content or a high energy value are stored in a different area of the repository as units with a lower ore content/energy value in each case.

As an alternative or in addition, a representation of the respective units can be presented or displayed as a virtual model of the repository or of the conveyor facility in the form of lists.

The representation of the respective virtual model enables a user to obtain at a glance an overview of significant functions of a mine, a loading station, a port installation or of another industrial installation.

In a further advantageous embodiment of the invention, there is a transport or the processing of the bulk material as a function of the material property of the respective unit.

A transport of the respective unit is understood as transport with the aid of the conveyor facility. The bulk material can be transported from the mine to a collection point or to the first processing point such as a mill.

Preferably, it can already be decided in the mine, in particular underground, after the ore has passed through the first analysis facility, whether it will be taken out of the mine or will remain underground, for example.

A further processing of the bulk material is understood as a crushing process, a fluidized bed combustion, a flotation method or other refining or other use of the bulk material.

With the material property, such as the hardness of the rock, the torque of a mill drive can be adapted, for example.

Further, by means of the combustion value of bulk material, e.g., coal, the supply to a combustion system can be controlled. This enables the processing of the respective unit of the bulk material to be improved.

In a further advantageous embodiment of the invention, the respective unit of the bulk material is tracked with the aid of a computer program, where a database is assigned to the computer program.

The computer program preferably has interfaces for accepting the material property of the respective unit. Furthermore, the computer program preferably has interfaces for output of control signals to the respective conveyor facility, to the loading and/or unloading apparatus.

The database serves to accommodate and/or to track the respective unit of the bulk material with the aid of the computer program. The computer program can be formed as the link element between the controller for conveyor facility, the loading and/or unloading apparatus and also the separation apparatus on the one side and the database on the other side.

Optionally, the database can be integrated into the computer program.

The use of a computer program enables the evaluation and/or the tracking of the respective unit to be achieved more easily and more quickly.

In a further advantageous embodiment of the invention, the database has an entry for the respective unit of the bulk material, where the position of the unit and/or the material property of the respective unit are assigned to the respective entry. Preferably, the respective entry also features the evaluation of the respective unit based on the material property.

Here, the database is preferably constructed dynamically, so that a new unit brought onto the conveyor facility generates a new entry and the entry that corresponds to a unit leaving the conveyor facility is deleted. Preferably, the respective conveyor facility and/or the respective repository are each assigned their own database.

In a further advantageous embodiment of the invention, as well as the assignment of the material property, the evaluation and/or the tracking of the respective unit of the bulk material occurs in real time.

The tracking of the respective unit in real time, even with a high throughput of bulk material, enables a secure and simple evaluation of the bulk material.

In a further advantageous embodiment of the invention, the first analysis apparatus and the separation apparatus are positioned in a mine.

It can in particular be decided below ground by the first analysis facility whether there is to be the effort of transporting units of the bulk material to the surface.

The positioning of the separation apparatus in the mine at the same time enables high-content ore or coal to be separated from barren rock.

The explicit analysis of the bulk material in the mine enables the effort of transport to be restricted to the units that are suitable for further processing.

In a further advantageous embodiment of the invention, the control facility serves to control the conveyor facility, where a control facility sets a speed of the conveyor facility via the material property.

In accordance with the material property, for example, a speed of a drive for a belt conveyor can be set. Through the speed of the belt conveyor, for example, a supply of a combustible bulk material, in particular coal, of a predetermined energy value can be set. Accordingly, for a low energy value of the bulk material transported on the conveyor facility, the speed of the conveyor facility would be increased.

A change in the speed of the conveyor facility advantageously enables varying material properties of bulk material to be compensated for in the subsequent processing of the bulk material.

In an advantageous embodiment of the invention, the control facility activates the separation apparatus, where the separation apparatus separates at least one unit of the bulk material based on the material property or the evaluation from the other units or supplies it to a further conveyor facility or to a repository.

A typical computer program has an interface to a database or has a database, where the computer program can be executed, at least in part, on a computing facility of the control facility, and where the computer program is configured to perform the method in accordance with the disclosed embodiments.

For implementing the method, the computer program product is preferably loaded into a working memory of a computing unit. The computer program is executed on at least one CPU of the computing unit.

Preferably, the computer program can be executed on a decentralized server, in particular a cloud. Furthermore, the computer program can be stored on a non-volatile data medium such as a CD-Rom, a USB stick or hard disk drive (HDD).

The use of the computer program enables the method to be performed securely and in real time.

An example of an apparatus for management of units of a bulk material has a first analysis facility for analysis and provision of a material property of a unit of the bulk material on a conveyor facility, where a control facility is configured for evaluation and for tracking of the respective unit, where the conveyor facility is intended for transport of the bulk material, where a repository is intended for accommodating the bulk material and the control facility is configured for determining a virtual model of the repository, and/or further having a separation apparatus, where the separation apparatus is configured for separating the units of the bulk material on the conveyor facility via the material property of the respective unit of the bulk material.

Preferably, the control facility is configured for control or regulation of the speed of the conveyor facility. The control facility is configured for accepting determined material properties from the analysis facility.

The separation apparatus advantageously serves to separate units of bulk material. The separation apparatus preferably serves to select units of the bulk material that are to be transported from the mine for further processing. Thus, for example, coal can be separated from barren rock or soil without the soil or the barren rock having to be transported out of the mine.

The control facility is assigned a computing unit and/or it comprises a computing unit. The computing unit serves, in particular with the aid of a database, to create the virtual model of the repository. Furthermore, the computing unit and/or the database with the computer program can be configured for virtual modeling of the conveyor facility. The virtual model of the conveyor facility comprises the position of the respective unit on the conveyor facility. Optionally, the respective unit is linked to its material property.

In a further advantageous embodiment of the invention, the apparatus comprises a second analysis facility, where the second analysis facility is configured for analysis of the respective unit of the bulk material, which has left the repository or the separation apparatus, as to its material property.

The first and the second analysis apparatus are preferably configured to work in the same way. Preferably, the respective material property is ascertained with the same method. In this way, the determined material properties of the respective unit are comparable.

Advantageously, the respective analysis facility is arranged after the separation apparatus or after the repository. The second analysis facility serves to analyze the units of the bulk material that are taken out of the repository or the units that have been separated from further units by the separation apparatus.

The second analysis facility can serve to ascertain the same material property as the first analysis facility. Optionally, with the aid of the second analysis facility, a further material property can be ascertained. For example, the water content of coal that has been stored in a repository can be ascertained.

Preferably, the evaluation and the tracking of the respective unit are improved via repeatedly ascertaining the material property.

Errors or inaccuracies in the evaluation or the tracking can in particular be detected with the aid of the second analysis facility.

In a further advantageous embodiment of the invention, the control facility is assigned a database. The database comprises an entry of the respective unit of the bulk material together with a position of the respective unit in the apparatus and/or the respective material property.

With the aid of the database, a unit of the bulk material can be tracked through the entire apparatus, i.e., along the respective conveyor facility as well as in the repository. Preferably, the tracking occurs such that the respective unit with position in the apparatus and the material property form one data record. The position of the respective unit preferably adapts itself to the speed of the conveyor facility.

In a further advantageous embodiment of the invention, the database further comprises the virtual model of the repository.

Preferably, the tracking of the respective unit of the bulk material is performed with the aid of a common database. The position of the respective unit of the bulk material in the repository is accordingly essentially constant for as long as the respective unit of the bulk material is located in the repository.

In a further advantageous embodiment of the invention, the repository is assigned a loading and/or unloading apparatus, where the virtual model of the repository comprises a processing profile of the repository and where via the processing profile of the repository the control facility is configured for control of the loading and/or unloading apparatus.

The processing profile of the respective repository preferably comprises the position of the respective unit in the repository, so that the unloading apparatus can remove a specific unit from the repository.

The profile of the repository preferably serves to activate the loading and/or unloading apparatus, so that the loading and/or unloading apparatus can take up or deposit the respective unit of the bulk material on the surface of the repository.

The profile of the repository can be computed with the aid of a physical model. As an alternative or in addition the surface can be ascertained with a 2D sensor, a 3D sensor or a camera. In particular, with a recompaction, weather influences or through an occasional slippage of bulk material in the repository, an experimental ascertaining of the profile of the repository is advantageous.

The invention described here can be applied in a mine, a port installation, a bulk material heap, a power station, an industrial plant, in particular in heavy industry, or a coal-fired power station. Furthermore, the apparatus described here can be a part of a port installation, a material store for bulk material or a mine. Preferably, the invention described here applies in the field of mining or ore extraction.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described and explained in greater detail below with reference to figures. The features shown in the figures can be combined by persons skilled in the art into new forms of embodiment. The embodiments shown in the figures and embodiments described here are merely to be understood as being by way of example and do not restrict the invention in any way, which.

DETAILED DESCRIPTION OF THE EXEMPLARY EMBODIMENTS

Figure 1:
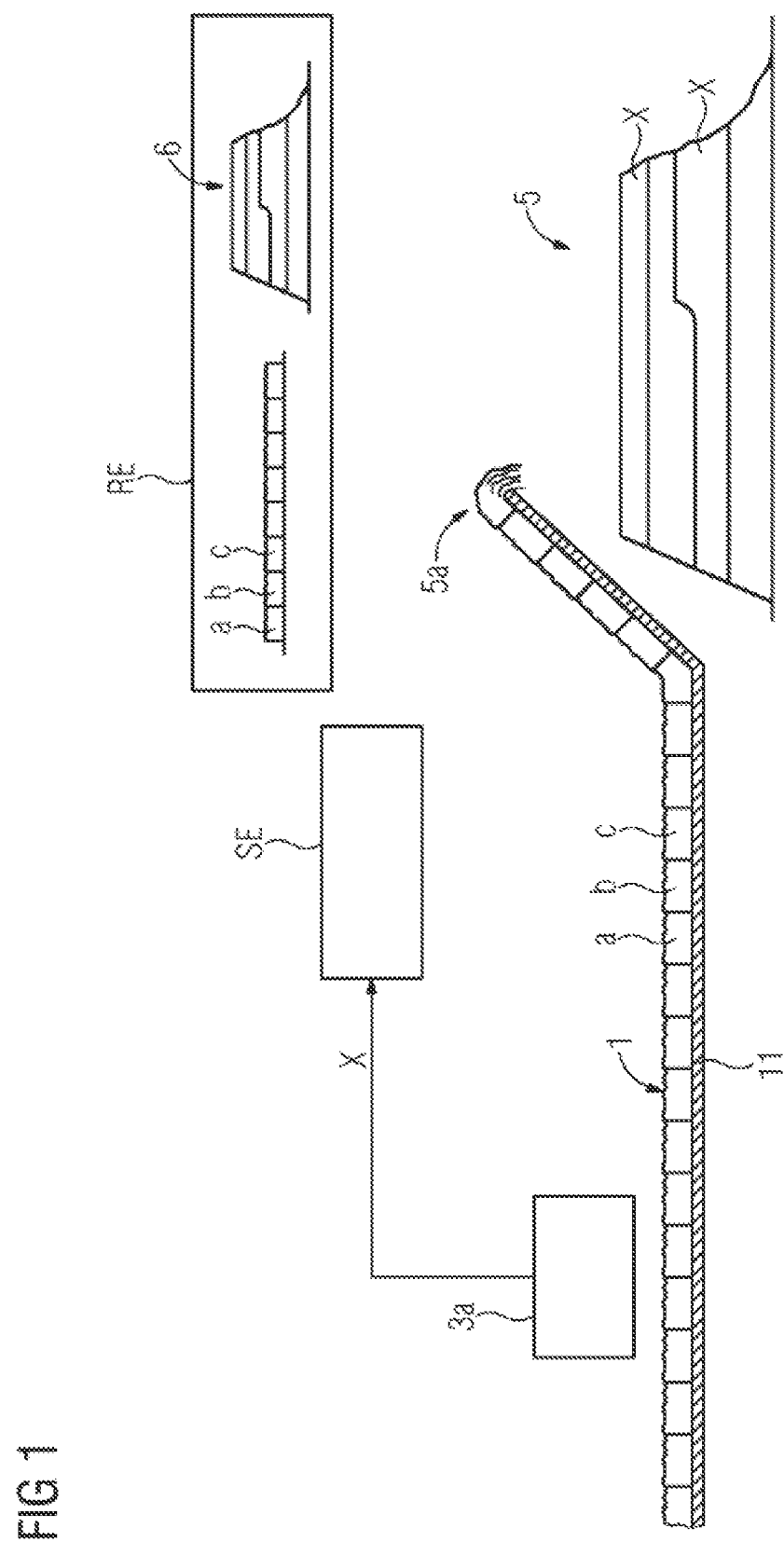
FIG. 1 shows a conveyor facility and a repository in accordance with the invention.

FIG. 1 shows a conveyor facility 11 and a repository 5. The conveyor facility 11 serves to transport the bulk material 1. The bulk material 1 is divided into units a, b, c. The units a, b, c of the bulk material 1 are each arranged adjacent to one another on the conveyor facility 11. The respective unit a, b, c of the bulk material 1 is analyzed to determine a material property X. A first analysis facility 3a serves to ascertain the material property X of the bulk material 1. The first analysis facility 3a serves to analyze the respective unit a, b, c of the bulk material on the conveyor facility. The conveyor facility 11 here is formed as a conveyor belt or as a belt conveyor. The conveyor facility 11 here is assigned to an unloading apparatus 5a for a repository 5.

The material property X of the respective unit a, b, c is provided to a control facility SE. The control facility SE is assigned a computing unit RE. The computing unit RE is configured to assign the material property X to the respective unit a, b, c of the bulk material 1. The assigned material property X for the respective unit a, b, c forms the basis for the entry that corresponds to the respective unit a, b, c. On the basis of the database 8, a virtual model 6 of the conveyor facility 11 and/or of the repository 5 is provided.

The units a, b, c of the bulk material 1 are stored in the repository 5. The repository 5 here is formed as a heap. The repository 5 is preferably divided into areas, where the respective area comprises units a, b, c of the bulk material 1 with a material property X. The position of the respective unit a, b, c on the conveyor facility 1 and/or in the repository 5 is stored in the virtual model 6 of the repository 5 or of the conveyor facility 1. Preferably, the virtual model 6 comprises the material property of the respective unit X. The material property X of the respective unit a, b, c can also be combined into areas in the virtual model 6 of the repository 5. This is indicated in the figure by the dividing lines in the repository 5.

Figure 2:
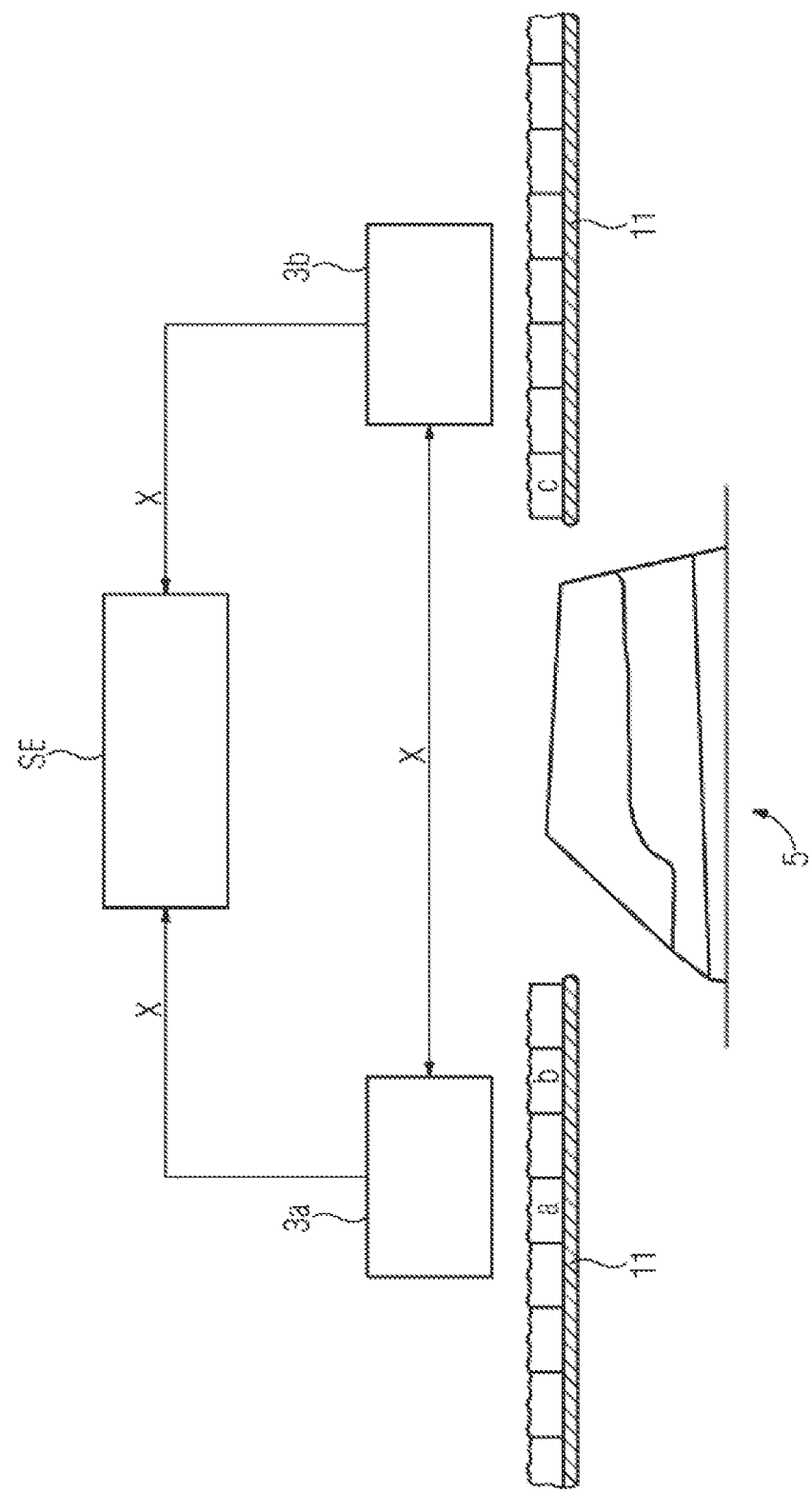
FIG. 2 shows a possible interaction between two analysis facilities in accordance with the invention.

FIG. 2 show a possible interaction between two analysis facilities 3a, 3b. The first analysis facility 3a serves to ascertain the material property X of the respective unit a, b, c of the bulk material 1 on the conveyor facility 11. The first analysis facility 3a provides the material property X in the form of a measurement result or a signal S to the control facility SE. The respective unit a, b, c of the bulk material 1 is stored at the repository 5 in the middle between the two conveyor facilities 11 and removed again later. The units a, b, c removed from the repository 5 are analyzed by the second analysis facility 3b. The second analysis facility 3b likewise provides the material property X of the respective unit a, b, c of the bulk material 1 to the control facility SE. The control facility is preferably configured to compare the material properties X of the respective unit a, b, c made available to it. Through this comparison, the accuracy of the virtual model 6 of the repository 5 and/or of the respective conveyor facility 11 can be checked.

The second analysis facility 3b can also transfer the material property X of the respective unit a, b, c as a comparison value to the first analysis facility 3a. The first analysis facility 3a can improve its function with this check. For example, a self-learning algorithm is assigned to the respective analysis facility 3a, 3b. The self-learning algorithm can be trained by the analysis of units with a known material property X. The second analysis facility 3b can naturally also be improved with the aid of material properties X of the respective unit a, b, c by the first analysis facility.

Figure 3:
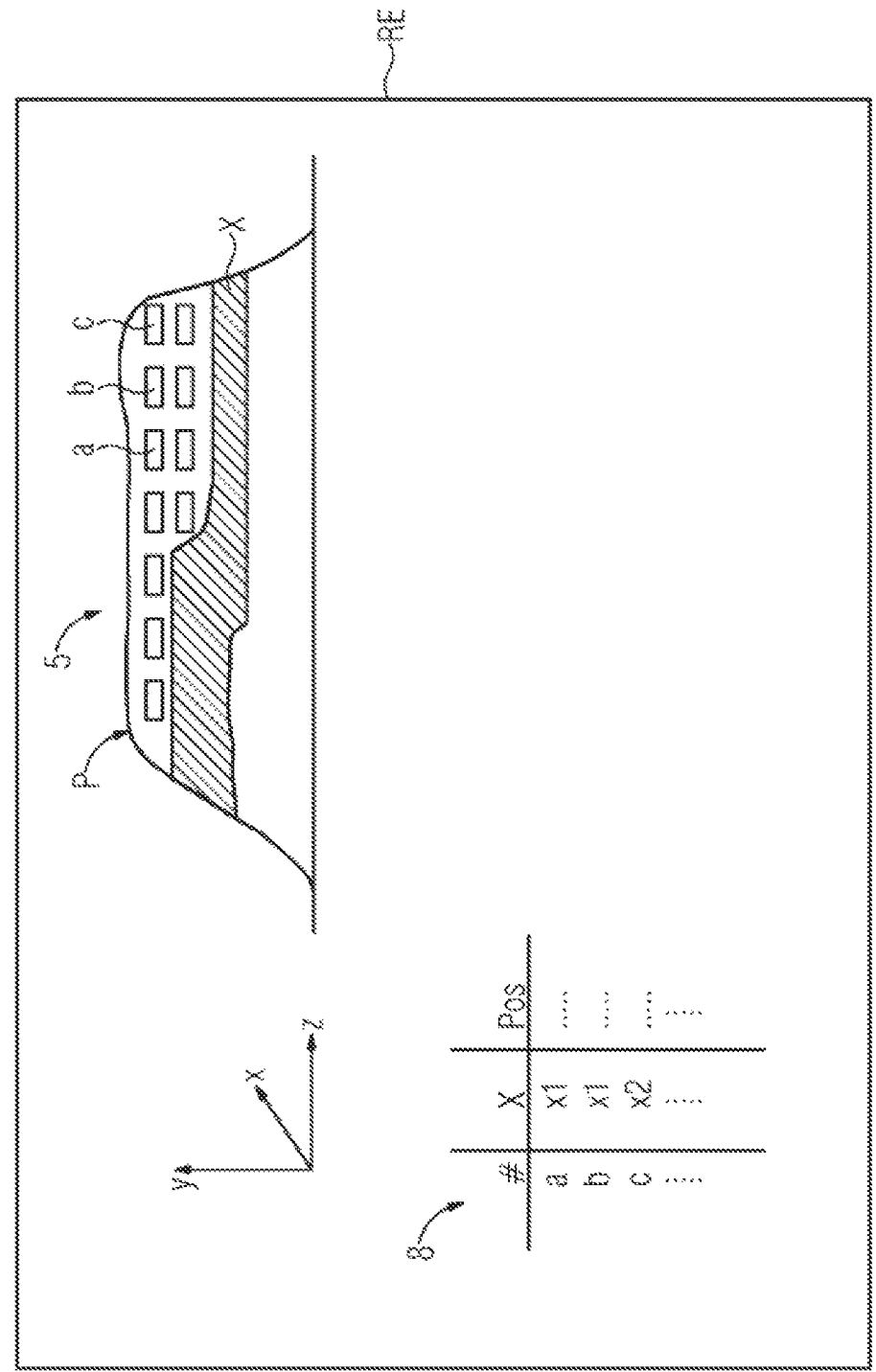
FIG. 3 shows an example of a virtual model of a repository in accordance with the invention.

FIG. 3 shows an example of a virtual model 6 of a repository 5. The repository 5 here is formed as a heap. The virtual model 6 of the repository 5 is symbolized once as a graphical model (at the top) and once as a database (at the bottom). The graphical model also comprises the processing profile P of the repository 5. The units a, b, c are arranged adjacent to one another in the repository 5. In particular, units a, b, c with the same or similar material properties X are arranged adjacent to one another. The spatial directions x, y, z in a Cartesian alignment are used for positioning of the respective unit a, b, c. The spatial directions x, y, z are moreover preferably used for definition of the processing profile P. The processing profile P is formed in a simple embodiment as a surface profile of the repository 5.

In the database 8, as a representation of the virtual model 6 of the repository 5, a data record comprises a unit a, b, c with a numbering #. The respective unit x, y, z is assigned a material property X. The respective unit a, b, c is further assigned the position Pos in the spatial direction x, y, z. For a change in the repository 5 through loading or unloading of units a, b, c of the bulk material or a compaction the virtual model 6 of the repository 5 is preferably adapted. Likewise, the processing profile P is preferably adapted to the new form of the repository 5.

The virtual model 6 of the repository 5 is provided with the aid of a computing unit RE. The computing unit RE preferably also has the database 8 shown.

Figure 4:
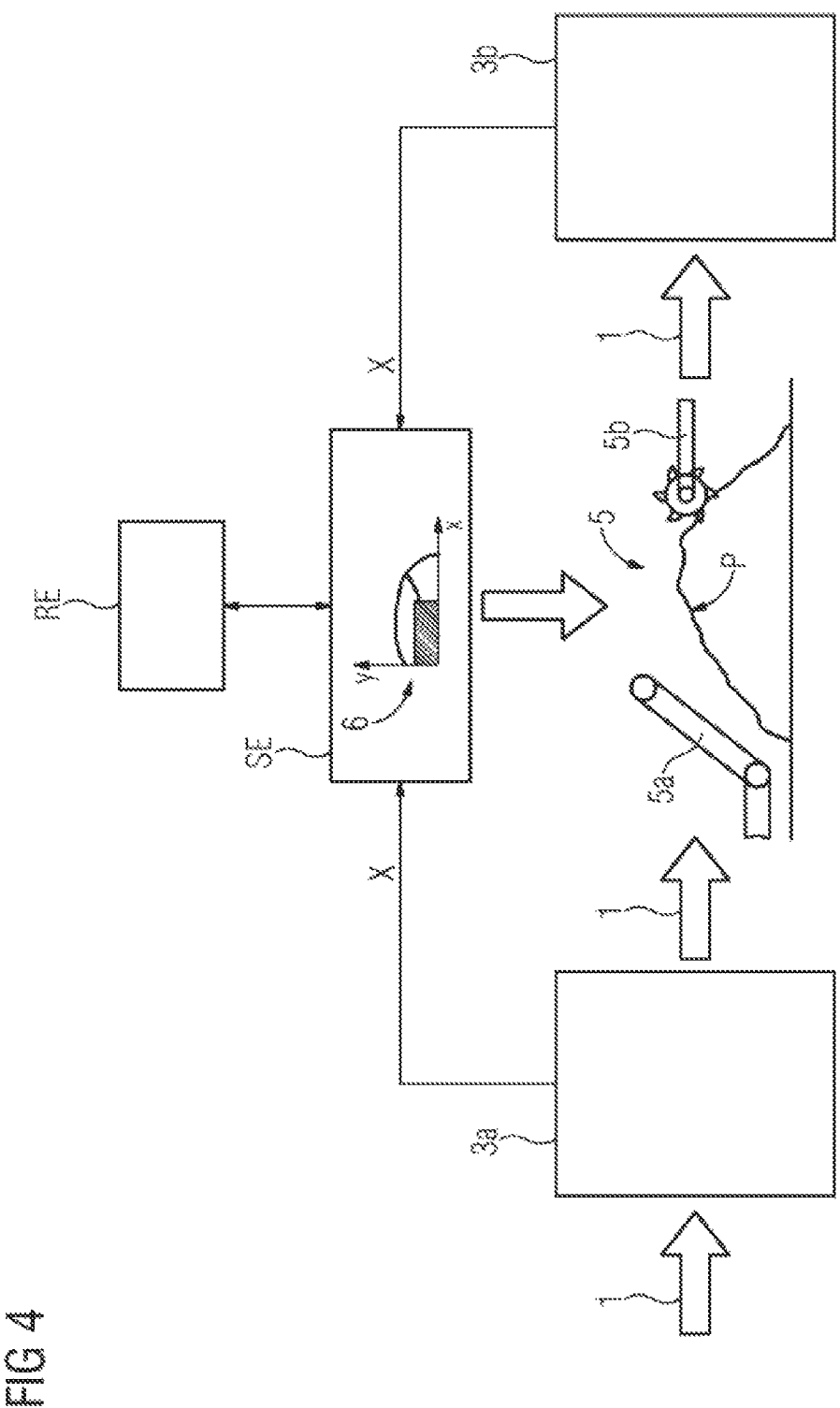
FIG. 4 shows a repository and two analysis facilities in accordance with the invention.

FIG. 4 shows a repository 5 and two analysis facilities 3a, 3b. The bulk material 1 passes through a first analysis facility 3a and is stored (temporarily) on the repository 5. The bulk material 1, which is removed from the repository 5, passes through a second analysis facility 3b. The repository 5 is assigned a loading apparatus 5a and a removal apparatus 5b. The use of a bucket wheel excavator can combine the loading apparatus 5a and the unloading apparatus 5b in one device. The first and second analysis facility 3a, 3b in each case provides the material property X of the respective unit a, b, c of the bulk material to the control facility SE. With the material property X of the bulk material 1, a virtual model 6 of the repository 5 is created. The virtual model 5 is created with a computing unit RE, which is assigned to the control facility SE. The control facility serves to control the loading apparatus 5a and the unloading apparatus 5b. The unloading apparatus 5b and optionally the loading apparatus 5a is controlled by means of the processing profile P of the repository 5.

Figure 5:
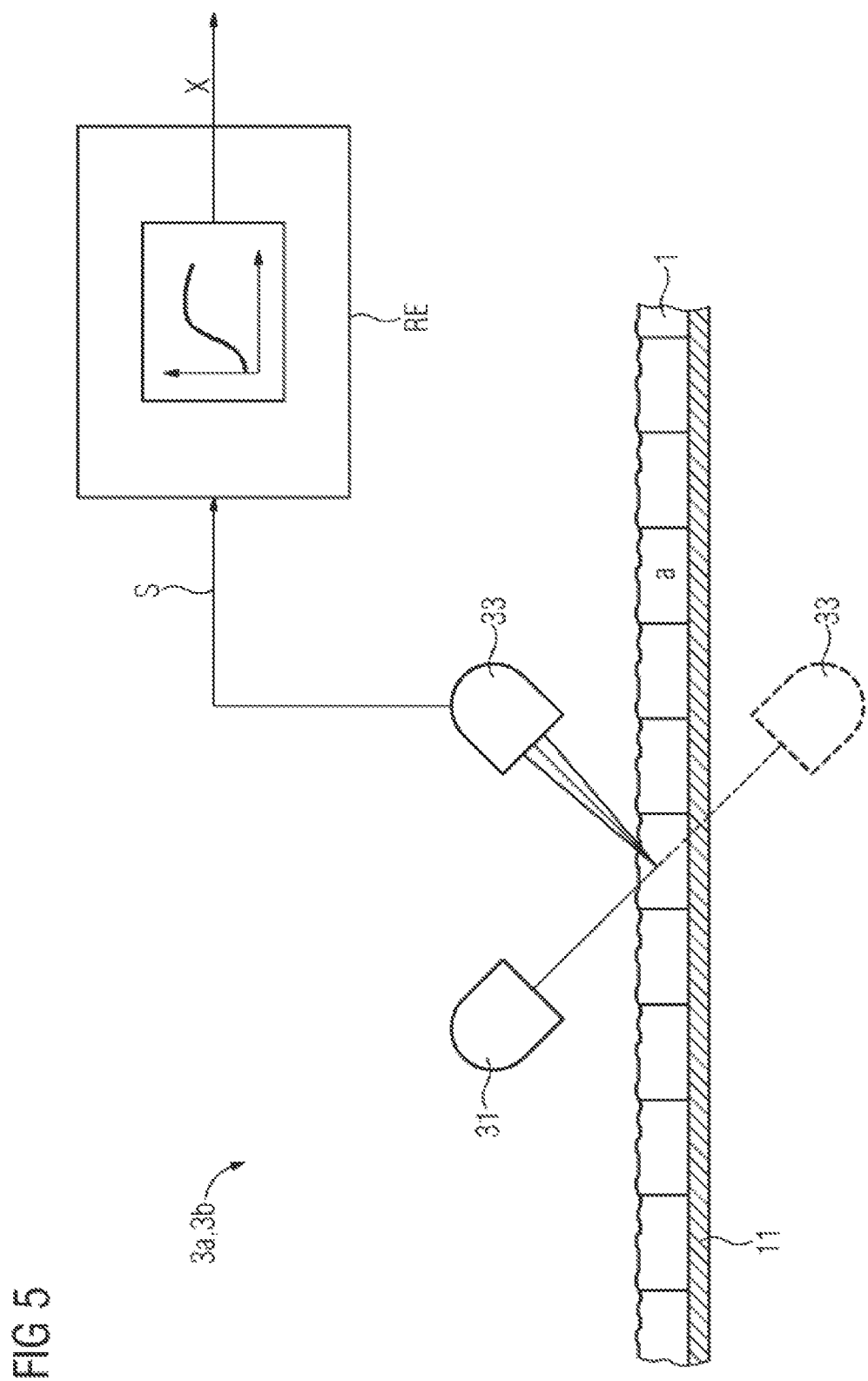
FIG. 5 shows an example of an analysis facility in accordance with the invention.

FIG. 5 shows an example of an analysis facility 3a, 3b. The analysis facility 3a, 3b comprises a conveyor facility 11 upon which the bulk material 1 is transported. The bulk material 1 can also be assigned to a unit a. The bulk material 1 is irradiated with a radiation source 31 with electromagnetic radiation. Preferably, the electromagnetic radiation is x-ray radiation. As an alternative a particle beam, such as a neutron beam, can interact with the bulk material 1. The bulk material 1 absorbs a part of the radiation, transmits a part of the radiation and possibly emits a fluorescence. The transmitted electromagnetic radiation and/or the reflected electromagnetic radiation or the fluorescence is detected with a detector 33. The detector 33 provides a signal S to a computing unit RE. The signal S preferably features a measurement result of the analysis facility 3a, 3b. The computing unit RE preferably creates a spectrum, for example, a fluorescence spectrum, from the signal S, as the measurement result. With the spectrum, the material property X of the bulk material 1 or of the respective unit a of the bulk material 1 is ascertained.

Figure 6:
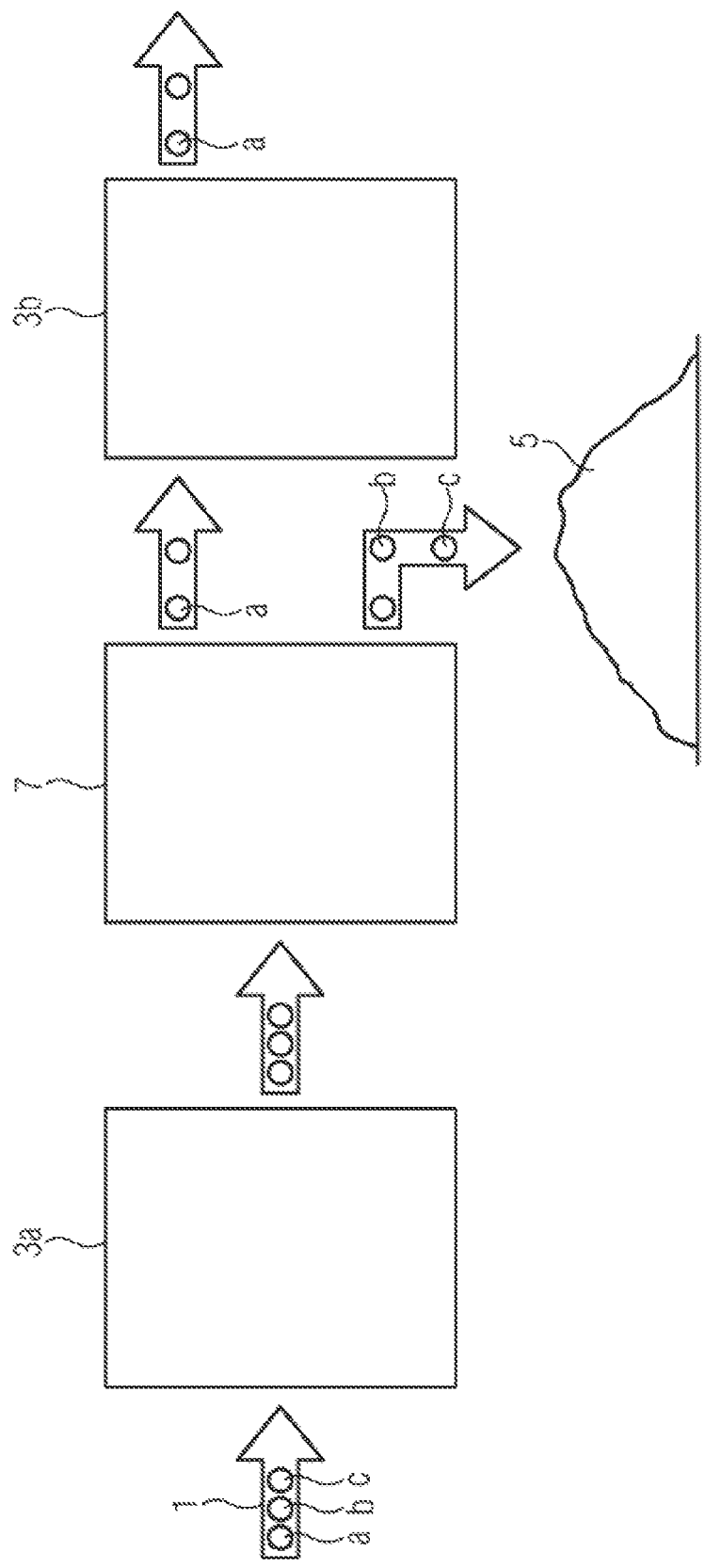
FIG. 6 shows an example of use of a separation apparatus in accordance with the invention.

FIG. 6 shows an example of using a separation apparatus 7. The separation apparatus 7 is provided with units a, b, c of bulk material 1. The respective unit a, b, c is assigned a material property X. By means of the material property X of the respective unit a, b, c the separation apparatus is activated in such a way that the units b, c, which are not provided to a second analysis facility 3b, are supplied to a repository 5, in particular to a heap. The other unit a of the bulk material is supplied to the second analysis facility 3b. This unit a is then supplied to further processing. The heap is intended for barren rock, for example, and only the units a of bulk material 1 with a specific material property X are supplied to further processing.

Preferably, a method and an apparatus for evaluation and tracking of units a, b, c of bulk material 1 comprises the following (i) the units a, b, c are investigated with a first analysis facility 3a as to a material property X, (ii) the material property X is assigned to the unit a, b, c in each case, and (iii) with the aid of a computing unit RE the units a, b, c can be tracked on the conveyor facility 11.

Preferably, the material property X is assigned while the respective unit a, b, c is located on the conveyor facility 11. With the material property X, there is preferably an evaluation of the respective unit a, b, c of the bulk material 1. The units a, b, c of the bulk material 1 can further be stored at a repository 5. The calculation of the arrangement of the bulk material 1 in the repository 5 enables the respective unit a, b, c to be assigned a position in the repository 5. With the respective position of the unit a, b, c, a virtual model 6 of the repository 5 can be provided. As an alternative or in addition, a separation apparatus 7 can be provided for separation of the units a, b, c of the bulk material 1. Before processing or a further transport, the respective unit a, b, c of the bulk material 1 can be analyzed with a second analysis apparatus 3b as to the material property X. The second analysis facility 3b can provide the first analysis facility 3a with the determined material property X. In this way, the functioning of the first analysis facility 3a can be improved. Through the use of a computer program in particular the evaluation and/or the tracking of the respective unit a, b, c can be done in real time.

In summary, the invention relates to a method and an apparatus for management of units a, b, c of bulk material 1 and also to a computer program. The method for management of units a, b, c of the bulk material 1 comprises determining a material property X of the respective unit a, b, c, in particular on a conveyor facility 11, storing an entry for the respective unit a, b, c with the respective material property X of the unit a, b, c and the position of the respective unit a, b, c in a database 8, and further include at least one of the following (i) determining a downstream transport path of the respective unit a, b, c on the basis of the respective entry in the database 8, (ii) adapting a subsequent processing of the respective unit a, b, c on the basis of the material property (X) of the unit a, b, c, and (iii) if the respective unit a, b, c is supplied to a repository, then creating a virtual model 6 of the repository 5, where a position of the respective unit a, b, c is stored with the respective material property X in the database 8.

Figure 7:
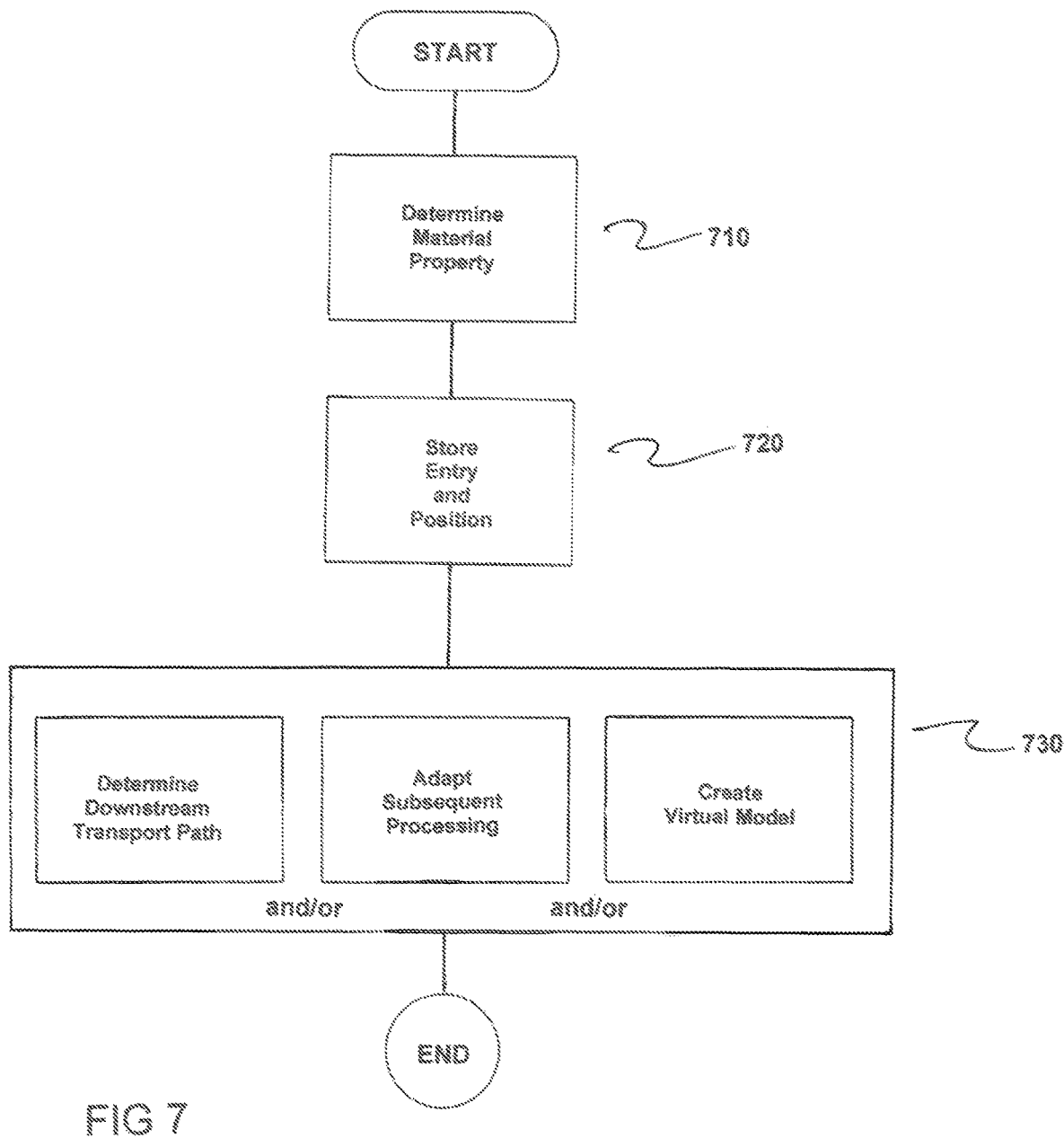
FIG. 7 shows a flowchart of the method in accordance with the invention.

FIG. 7 shows a flowchart of a method for managing units of bulk material 1 of an ore mine with a throughput in a region of a few tons of bulk material per minute. The method comprises determining a material property X of a respective unit a, b, c on a conveyor facility 11, as indicated in step 710.

Next, an entry for the respective unit a, b, c with the determined material property X of the respective unit a, b, c and a position of the respective unit a, b, c are stored in a database 8, as indicated in 720.

Next, at least one of the following are performed (i) determine a downstream transport path of the respective unit a, b, c based on a respective entry stored in the database 8, (ii) adapts subsequent processing of the respective unit a, b, c based on the determined material property X of the respective unit a, b, c, and (iii) create a virtual model 6 of the repository 5 if the respective unit a, b, c is supplied to a repository 5, as indicated in step 730. In accordance with the method of the invention, the position of the respective unit a, b, c is stored in the database 8 with the respective material property X.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for managing units of bulk material of an ore mine with a throughput in a region of a few tons of bulk material per minute, comprising:
   determining a material property of a respective unit on a conveyor facility;
   storing an entry for the respective unit with the determined material property of the respective unit and a position of the respective unit in a database, the method further comprising at least one of:
      determining a downstream transport path of the respective unit based on a respective entry stored in the database,
      adapting subsequent processing of the respective unit based on the determined material property of the respective unit, and
      creating a virtual model of the repository if the respective unit is supplied to a repository;
   wherein the position of the respective unit is stored in the database with the respective material property.

2. The method as claimed in claim 1, wherein the position of the respective unit in the database is ascertained aided by a speed of the conveyor unit.

3. The method as claimed in claim 1, wherein a separation apparatus is controlled via the respective entry in the database; and
   wherein the separation apparatus separates units via the respective material property via one of (i) a first conveyor facility for further processing and (ii) a further conveyor facility for storage on a heap.

4. The method as claimed in claim 2, wherein a separation apparatus is controlled via the respective entry in the database; and
   wherein the separation apparatus separates units via the respective material property via one of (i) a first conveyor facility for further processing and (ii) a further conveyor facility for storage on a heap.

5. The method as claimed in claim 1, wherein the material property of the respective unit is ascertained via a first analysis facility; and
   wherein the material property of the respective unit is ascertained on/in the conveyor facility.

6. The method as claimed in claim 1, wherein the material property is assigned to the respective unit while the respective unit is located on the conveyor facility.

7. The method as claimed in claim 1, wherein at least one of (i) an assignment of the material property to the respective unit occurs in real time and (ii) an assignment of an evaluation to the respective unit occurs in real time.

8. The method as claimed in claim 1, wherein the content of at least one of (i) the database and (ii) the virtual model is displayed to a user.

9. The method as claimed in claim 1, wherein a processing profile of the repository is determined via the virtual model of the repository; and wherein at least one of (i) a loading apparatus and (ii) unloading apparatus is activated via the processing profile.

10. The method as claimed in claim 1, wherein the material property of the respective unit is ascertained aided by a self-learning algorithm.

11. The method as claimed in claim 1, wherein the material property of at least a part of the units is re-determined at a second position.

12. The method as claimed in claim 1, wherein the virtual model of the repository is updated after removal of a unit.

13. The method as claimed in claim 1, wherein a unit removed from the repository is tracked via a virtual model of the conveyor facility.

14. The method as claimed in claim 1, wherein at least a part of the method is executed aided by at least one processor of at least one computing unit.

15. A computer program which performs the method as claimed in claim 1, wherein the computer program is executable on at least one computing unit aided by at least one processor; wherein a database is assigned to the computer program; wherein the computer program at least one of (i) creates and (ii) updates entries in the database; wherein the database includes an entry for the respective unit of the bulk material of the ore mine; and wherein at least one of (i) the position of the unit and (ii) the material property of the respective unit are assigned to the respective entry.

16. An apparatus for management of units of bulk material of an ore mine with a throughput in a region of a few tons of bulk material per minute, comprising:
    a conveyor facility;
    at least one first analysis facility; and
    a control facility;
    wherein the control facility configured to:
    determine a material property of a respective unit on a conveyor facility;
    store an entry for the respective unit with the determined material property of the respective unit and a position of the respective unit in a database, the control facility being further configured to at least one of:
        determine a downstream transport path of the respective unit based on a respective entry stored in the database,
        adapt subsequent processing of the respective unit based on the determined material property of the respective unit, and
        create a virtual model of the repository if the respective unit is supplied to a repository;
    wherein the position of the respective unit is stored in the database with the respective material property.

* * * * *